United States Patent [19]

Rattunde et al.

[11] Patent Number: 5,045,028

[45] Date of Patent: Sep. 3, 1991

[54] CONE DISK TRANSMISSION, ESPECIALLY FOR MOTOR VEHICLES

[75] Inventors: Manfred Rattunde; Hans Buttner, both of Bad Homburg von der Hohe, Fed. Rep. of Germany

[73] Assignee: Reimers Getriebe AG, Zug, Switzerland

[21] Appl. No.: 524,646

[22] Filed: May 16, 1990

[30] Foreign Application Priority Data

May 30, 1989 [DE] Fed. Rep. of Germany ....... 3917466

[51] Int. Cl.$^5$ .......................... F16H 9/18; F16H 9/26; F16H 59/14
[52] U.S. Cl. ........................................ 474/17; 474/19; 474/21; 475/211
[58] Field of Search ............... 475/209, 210, 211, 212, 475/218; 474/19, 12, 17, 18, 28, 46, 70, 21

[56] References Cited

U.S. PATENT DOCUMENTS

| | | | |
|---|---|---|---|
| 3,052,132 | 9/1962 | Dittrich et al. | 474/18 |
| 3,600,960 | 8/1971 | Karig et al. | 474/12 |
| 3,875,814 | 4/1975 | Steuer | 474/19 X |
| 4,116,080 | 9/1978 | Berens | 474/28 X |
| 4,360,353 | 11/1982 | Hattori et al. | 474/12 |
| 4,599,916 | 7/1986 | Hirosawa | 475/210 |
| 4,644,820 | 2/1987 | Macey et al. | 475/211 |
| 4,913,684 | 4/1990 | Mantovaara et al. | 474/12 |
| 4,942,786 | 7/1990 | Dittrich | 74/867 |

FOREIGN PATENT DOCUMENTS 1256022 12/1967 Fed. Rep. of Germany ........ 74/343
58-0028047 2/1983 Japan .................................. 475/210

Primary Examiner—Richard Lorence
Assistant Examiner—David E. Henn
Attorney, Agent, or Firm—Frishauf, Holtz, Goodman & Woodward

[57] ABSTRACT

A cone disk transmission, particularly for motor vehicles, has an infinitely settable and variable ratio. The transmission uses two pairs of cone disks (2, 3), connected by a coupling belt or chain (24). On cone disk of each pair is axially displaceable, and selectively positionable against the traction element running between the cone pairs by a hydraulic positioning system, for generating engagement or gripping or clamping forces. The positioning pressure is controlled by pressure fluid derived from a spool valve (10). Torque sensors (16, 17) located on the transmission shafts throttle return flow of hydraulic pressure fluid from the control valve, as a function of load. In accordance with the invention, the torque sensors are immediately activated as a function of the intended operating state of the transmission, that is, the direction of transfer of power between the pairs of cone disks, by coupling both of the torque sensors to a transfer valve (FIG. 1: 19) operated by a clutch engagement pressure, or to the spool valve in parallel (FIG. 2), in series (FIG. 3) or cross-connected directly (FIG. 4) from a 2-return pressure line spool valve (88).

10 Claims, 3 Drawing Sheets

CONE DISK TRANSMISSION, ESPECIALLY FOR MOTOR VEHICLES

Reference to related patents and applications assigned to the assignee of this applications, the disclosures of which are hereby incorporated by reference:
U.S. Pat. No. 4,261,213, Rattunde
U.S. Pat. No. 4,439,170, Steuer
U.S. Ser. No. 07/314,545, Dittrich, now U.S. Pat. No. 4,942,786
U.S. Ser. No. 07/378,362, Rattunde, now U.S. Pat. No. 4,927,404.
Reference to related publications:
German 18 16 950
German 29 48 681

FIELD OF THE INVENTION

The present invention relates generally to a cone disk transmission, especially for motor vehicles, having an infinitely settable and variable transmission ratio, and, more particularly, to such a transmission having two pairs cf cone disks on respective shafts.

BACKGROUND

The shafts of such transmissions form a driving shaft and a driven shaft. One disk of each pair is axially displaceable and part of a hydraulic gripping or clamping mechanism, acted upon by pressurized fluid and firmly joined to the associated shaft, for generating the compression forces upon a traction element running between the cone disks. For setting and maintaining the transmission ratio, the gripping mechanism is controlled by pressurized fluid and a control valve, typically a spool valve, which is settable by a control element which controls pressure fluid in lines coupled to the control valve. Torque sensors located on the transmission shafts in the flow of torque are located in a pressure fluid return line coupled to the spool valve; by a torque-dependent relative motion of two valve parts relative to one another, they throttle the system pressure as a function of load and thus determine the pressure fluid pressure on the gripping or clamping mechanism, controlling the pressure as a function of load. The torque sensors are controllable in their operation as a function of the operating state of the transmission.

Cone disk transmissions of this kind are known for instance from U.S. Pat. No. 4,261,213 and earlier German patent 18 16 950. Good disk gripping conditions are obtained if, as taught particularly by the U.S. patent, a torque sensor disposed on the drive mechanism determines the basic pressure of the hydraulic system, and this basic pressure acts upon the driven side of the transmission. With the aid of the control valve, a necessarily higher pressure is mainted on the drive side as known in cone disk transmissions to obtain the desired transmission ratio.

The torque sensor on the driving side is hydraulically inserted into the return line of the control valve; FIG. 10 of the aforementioned U.S. Pat. No. 4,261,213 shows such a system. In that construction, a hydraulic changeover switch, i.e. a valve, is provided which, upon an operationally dictated change between the driving shaft and the driven shaft, always puts the torque sensor on the applicable drive mechanism into action. In terms of its switching position, the changeover switch is acted upon by the respective pressures of the fluid on the driving and driven sides, and its switching position is determined by the higher pressure fluid pressure on the applicable drive side.

This known system function only with considerable inertia, however. A change in load direction between the two sides, interchange of driving and driven sides of the transmission requires that the control valve must first react to the imbalance in forces between the two transmission sides that is, driving and driven sides, before a changeover can be made. It is accordingly not well suited for applications where the gripping system must adjust rapidly to the change in load direction, i.e. direction of power flow.

The aforementioned disadvantage arises particularly when the cone disk transmission is used along with a planetary gear in a multirange transmission of the kind described in German patent Disclosure Document DE-OS 29 48 681. The changeover from one gear range to another with the aid of clutches causes a sudden change in load direction for the cone disk transmission.

THE INVENTION

It is an object of the invention to provide a cone disk transmission with torque sensors which can be addressed directly and hence made active without involving the functionally dictated reactions of the cone disk transmission to the intended operating states.

Briefly, the torque sensors on both of the shafts are directly hydraulically coupled to the control spool valve to respond instantaneously as the spool valve responds to command inputs, without the delays inherent in cone disk adjustment.

The system is suitable for combination with a gearing arrangement. In accordance with a first embodiment of the invention, the output side of the cone disk transmission is coupled to a planetary gear through a first clutch and a step-down gear. The sun wheel is coupled to the driven shaft, while its annular or annulus forms the transmission output. A second clutch is located between two parts of the planetary gear, by means cf which second clutch the gearing of the planetary gear can be uncoupled. The clutches are controlled to be engaged alternately, as will appear. The control spool valve can be set as a function of transmission ratio and vehicle date, which data are supplied to a control unit from an external source. A control setting device which is, in turn, controlled by controls of the spool valve. The clutches are also engageable and disengageable as a function of the transmission and vehicle data. A changeover or transfer switching valve for the selective connection of one of the torque sensors is located in the return line of the pressure fluid. The changeover switching valve connects the torque sensor on the driving side to the return line of the control valve when the second clutch is closed, and connects the torque sensor on the driven side to the return line of the control valve when the second clutch is disengaged.

This arrangement has the advantage that, upon switching of the second clutch which causes a change in direction of power flow, the changeover valve is immediately controlled and hence causes corresponding the applicable torque sensor to be rendered effective. Thus there is no need to wait first for a reaction of the cone disk transmission and a resultant change at the control valve and a consequent effect on the changeover valve. Thus, the torque sensors are immediately set up for the new operating state, independently of the extent to which the cone disk transmission has already adjusted to this new operating state.

Preferably the clutches are hydraulically actuatable clutches, to which the pressure fluid is apportioned via switching valves that are acted upon by the control unit. The changeover valve is hydraulically shiftable from a switching position determined by a compression spring into a second switching position counter to the action of the compression spring. The changeover switch can be simultaneously supplied with the pressure fluid by the switching valve for the second clutch.

In accordance with a feature of the invention, the torque sensors can be placed, in parallel or in series, in the pressure fluid return.

According to another feature of the invention, the control valve is a four-edge control spool or slider valve without connection of the pressure fluid flowing out to the return line via the control edges remote from the pressure fluid inflow. The return flow side of a part of the four-edge control spool or slider valve, associated with the hydraulic gripping system of one of the transmission shafts is connected to the torque sensor on the other transmission shaft.

The control spool has separate connections for the return flow or outflow of pressure fluid, and from these connections, lines lead in each case to the torque sensor of the particular set of disks the gripping or clamping mechanism or system which is not coupled to the adjoining part of the control spool.

As a result the torque sensor on the applicable drive side determines the gripping force on the applicable driven set of disks; the effectiveness of the particular sensor is likewise immediately set by the setting of the control spool, regardless of when or after how long a time the cone disk transmission reacts to a changed setting of the control slider.

The structure of the torque sensor includes a revolving cylinder closed in a fluid-tight manner on both ends and fixed axially and circumferentially, on the transmission shaft. A piston is located in the cylinder, which rotates with the transmission shaft. It is supported on the transmission shaft while being axially displaceable and transmits torque to the transmission shaft. The piston divides the cylinder into a front cylinder chamber and a rear cylinder chamber; it is acted upon by the hydraulic pressure in the pressure cylinder; in the front cylinder chamber, both the piston and the associated cylinder bottom have axially protruding curve portions, e.g. V-shaped notches, facing one another between which roller bodies are placed for torque transmission. The axial position of the piston, determined by the transmitted torque also influences throttle valve for setting the hydraulic pressure operative in the pressure cylinder and in the rear cylinder chamber. The hydraulic pressure on the one hand is sufficient to generate the pressure force required for torque transmission between the cone disks and, on the other, due to pressure on the surface area of the piston, holds axial forces in equilibrium. The axial forces are exerted as a result of the angles of inclination of the flanks of the V-shaped notches on the curved parts on the piston. For details of this construction, reference is again made to U.S. Pat. No. 4,261,213.

According to a feature of the invention, a torque sensor generally constructed in accordance with U.S. Pat. No. 4,439,170, includes a first ring, remote from the fixed cone disk, carrying one of the pressing cams. The first ring is axially firmly supported in the transmission shaft and connected to it in a manner fixed against relative rotation. A second ring, carrying the other one of the pressing cams, is located on the transmission shaft to be axially displaceable and rotatable between the first ring and the fixed cone disk. Together with the transmission shaft and the fixed cone disk, it forms a throttle valve and serves to introduce the torque into the transmission or transmit the torque out from the transmission.

According to a feature of the invention, the second ring is pre-stressed in the direction of the fixed cone disk by a compression spring supported on the shaft. This provides a further possibility for reducing the effects of changes in direction and fluctuation in torque upon the pressing-together of the disk sets or pairs or, in other words, upon hydraulic compression of the gripping or clamping means, by reducing or increasing the torque-dependent component of the pressure according to a superimposed spring force acting upon the movable second sensor ring.

A feature common to all the embodiments of the invention is that the torque sensors are addressed directly as a result of changes in the operating conditions for the cone disk transmission, without being dependent first on control variables that result from a reaction of the adjustment of the cones of the cone disk transmission to the new operating condition. This is accomplished either by providing that the torque sensors are addressed directly and in parallel or in series by the command control variables for changing the operating conditions of the transmission; or when coupled in the return flow from the control valve, that the torque sensors are, by being placed in the appropriate state, in accordance with the intended or commanded or desired operating conditions of the transmission.

DRAWINGS

Further features and details of the invention will become apparent from the following description of embodiments shown in the drawings. The drawings are schematic views, because details of the various components used are known per se. Reference should be made as needed to the aforementioned prior art patents and applications, the disclosures of which are hereby incorporated by reference.

Shown in the drawing are:

FIG. 1, a motor vehicle drive system with a cone disk transmission, a planetary gear, only schematically and symbolically shown, and a four-edge spool control valve;

FIG. 2, a simplified view of another version of a cone disk transmission, torque sensor and spool control valve system;

FIG. 3, another version, in a view comparable to FIG. 2;

FIG. 4, still another version, shown simplified as in FIG. 2; and

FIG. 5, an axial sectional view of a torque sensor for the above-mentioned systems.

DETAILED DESCRIPTION

Figure 1:
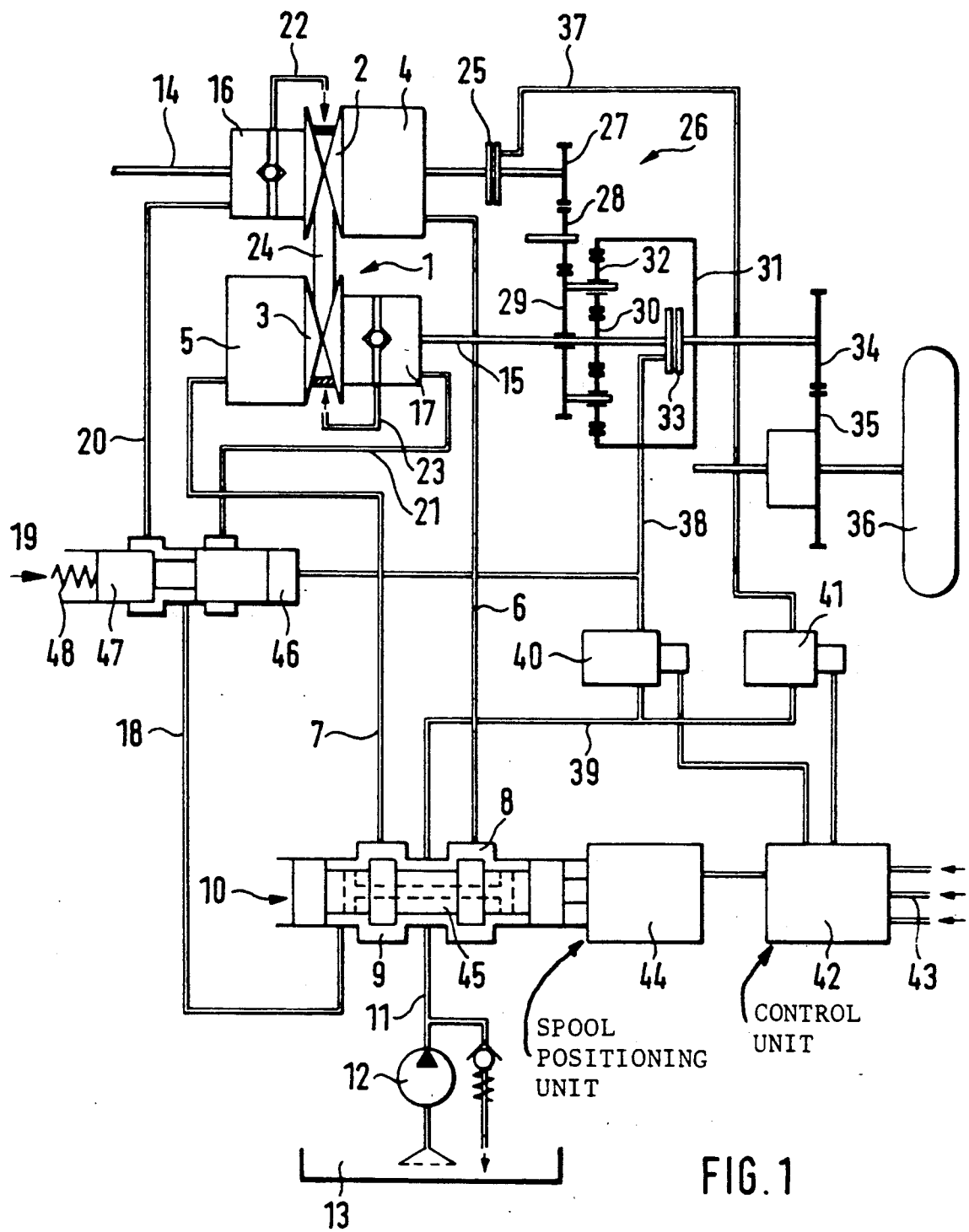

FIG. 1 shows a cone disk transmission 1. The belt or chain gripping or clamping means for the axially displaceable cone disks 2 and 3 are formed by hydraulic cylinder and piston assemblies 4 and 5, which are connected via pressure fluid lines 6 and 7 to the associated parts 8 and 9 of a four-control edge spool valve 10, to which the pressure fluid to be distributed is delivered by a pressure fluid pump 12 from a pressure fluid reservoir, sump, or supply 13 via a line 11. Valve 10 also has a return flow or outflow connection line 18.

Torque sensors 16, 17 are mounted on the respective transmission shafts 14, 15 on the side opposite the clamping mechanism 4, 5; the pressure fluid flowing out from the control spool valve 10 in a return flow path, flows first to the torque sensors 16, 17 via the line 18, a changeover switch 19, and from there to the torque sensors 16, 17 via lines 20, 21. From the torque sensors 16, 17, the pressure fluid then drains or flows out unpressurized respectively through the lines 22, 23 in the direction of the pressure fluid reservoir or sump 13; it can simultaneously lubricate the traction device 24, e.g. a belt or chain, running between the cone disks 2, 3, as shown schematically by the arrows at the end of lines 22, 23.

A planetary gear 26 is connected to the output side of the cone disk transmission, beginning at the upper or first shaft 14 via a first clutch 25. Following the clutch 25, a planet carrier or a fixed link 29 is driven via gear 27 and an intermediate gear 28. The fixed link 29 is rotatably supported at one end on the drive shaft 15 of the lower or second con disk transmission unit and carries on its other end the sun wheel 30 of the planetary gear and an inner gear wheel 31 of the planetary gear; the inner gear wheel 31 meshes in a known manner with the planet wheels 32 rotatably supported on the fixed link 29, which in turn mesh with the sun wheel 30.

The shaft 15 is provided with a second clutch 33 between the sun wheel and the inner gear wheel 31.

The shaft 15 is connected at its end to a driven gear wheel 34, which, via a further gear wheel 35, acts upon a wheel 36 of a vehicle, shown only in simplified form.

The clutches 25 and 33, shown only in simplified schematic form, are hydraulically shiftable clutches. They can be acted upon by pressure fluid in accordance with the respectively desired switching states via pressure fluid lines 37, 38; the pressure fluid likewise reaches switching valves 40, 41 via the pump 12, from the pressure side of the control valve 10 via a line 39; beginning at these switching valves, the pressure lines 37, 38 lead to the clutches 25, 33. The switching valves 40,41 are acted upon or shiftable by means of a control unit 42, which is supplied as indicated by the arrows 43 with the actual and setpoint or command values of the operating state set for the drive mechanism shown a a whole in FIG. 1; from there, corresponding control signals or variables are sent first to the switching valves 40,41 and secondly to a positioning or setting unit 44 which controls the axial setting of the spool or slider 45 of the four-edge control valve 10.

A pressure cylinder chamber 46 of the changeover switch valve 19 is also connected to the output side 38 of the switching valve 40 that is connected to a clutch 33. Clutch 33 is arranged inside the planetary gear on the driven side. Changeover or transfer valve 19 has a valve or switch element 47 which is movable between two switching positions back and forth by the hydraulic pressure prevailing in the pressure cylinder chamber 46, counter the action of a spring 48. Valve element 47 connects either the torque sensor 16 or the torque sensor 17 to the return line 18; the switching position connecting the line 18 via line 20 to the torque sensor 16 corresponds to the engaged state of the second clutch 33 of the planetary gear, i.e. the state when the line 38 is pressurized by the switching valve 40.

The other switching position of changeover switching valve 19 is correspondingly obtained by not acting upon the pressure cylinder chamber 46 with pressure fluid, so that the spring 48 can displace the valve element 47 into the right-hand switching position, not shown in FIG. 1, where the line 18 communicates with the torque sensor 17 via line 21.

The structures of the torque sensors 16, 17 are basically as described in U.S. Pat. No. 4,261,213 or the older German patent 18 16 950, or they preferably are as described below with reference to FIG. 5. The combination of a cone disk transmission 1 with a planetary gear 26 is apparent from FIG. 1; reference is further made to German patent Disclosure Document DE-OS 29 48 681, from which details of conditions relating to reverse and slow forward drive of the wheel 36 with the clutch 25 closed and a subsequent forward drive with a closed clutch 33 and an open clutch 25 are apparent.

The definite factor in the present case, in contrast to the subject of U.S. Pat. No. 4,261,213, is that the torque sensors 16, 17 are controlled directly by a branch from the control line 38 for the clutch 33, via the changeover switching valve 19, so that the respective torque sensor 16 or 17 is immediately connected to the return line 18 of the control spool valve 10, depending on whether the clutch 33 is disengaged or engaged.

Operation, system of FIG. 1

The position of the slide 45 of the control spool valve 10, that ensues upon actuation of the clutch 33 does not initially control the changeover switch 19 via the transmission state as established for the cone disk transmission 1; instead, hydraulic switch 19 is immediately controlled upon actuation of the second clutch 33 by the switching valve 40.

In the embodiment of FIG. 1, the spool 45 of the known spool control valve 10 is acted upon by a control unit 42 and a positioning element 44; this is in accordance with modern construction, particularly in motor vehicle transmissions. Naturally in simplified form as shown in FIG. 10 of U.S. Pat. No. 4,261,213, an action by means of a control lever of the type shown there and engaging the spool 45 of the four-edge control valve 10 is equally possible; this lever senses the actual value of the transmission ratio and also by means of an operator controllable handle, determines a set-point or command value.

Figure 2:
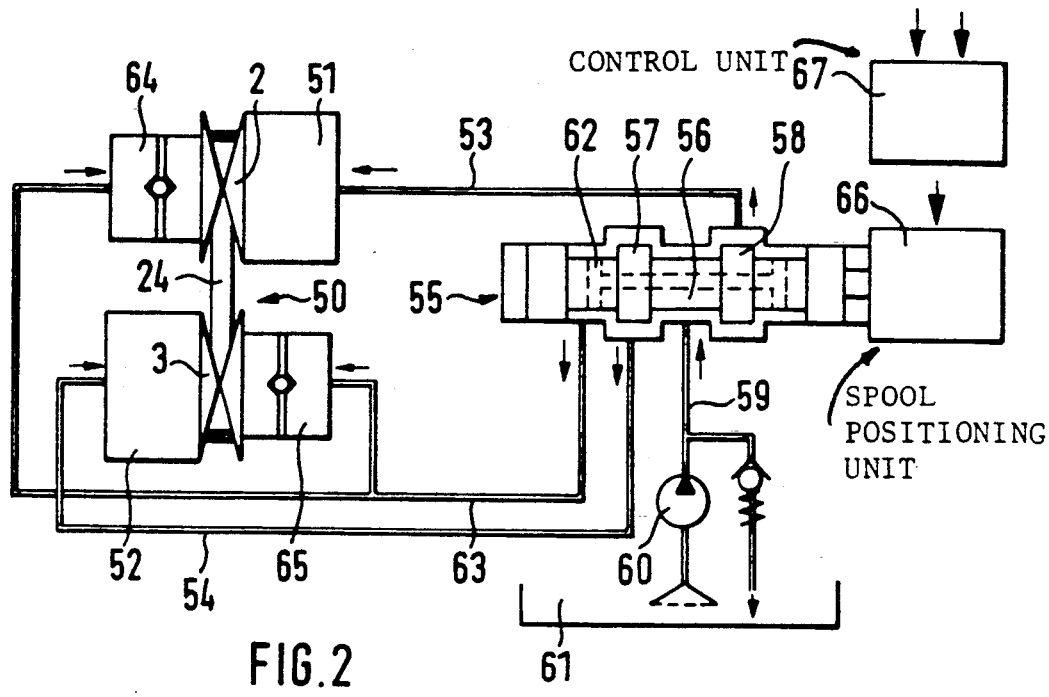

Embodiment of FIG. 2

FIG. 2 shows a cone disk transmission 50, which can be coupled to a planetary gear in the manner shown in FIG. 1, but need not be since this is not of major importance in this connection.

The cone disk transmission 50 again has a gripping system 51 and 52, which via pressure fluid lines 53 and 54, coupled to a four-edge spool valve 55, are acted upon by pressure fluid in accordance with the desired operating conditions. The control parts 57 and 58 of the spool 56 of the spool valve 55 apportion this pressure fluid to the gripping or clamping mechanisms 51, 52. The spool valve 55 draws the pressure fluid from a pressure fluid supply 61 via an inflow line 59 from a pressure fluid pump 60.

Figure 5:
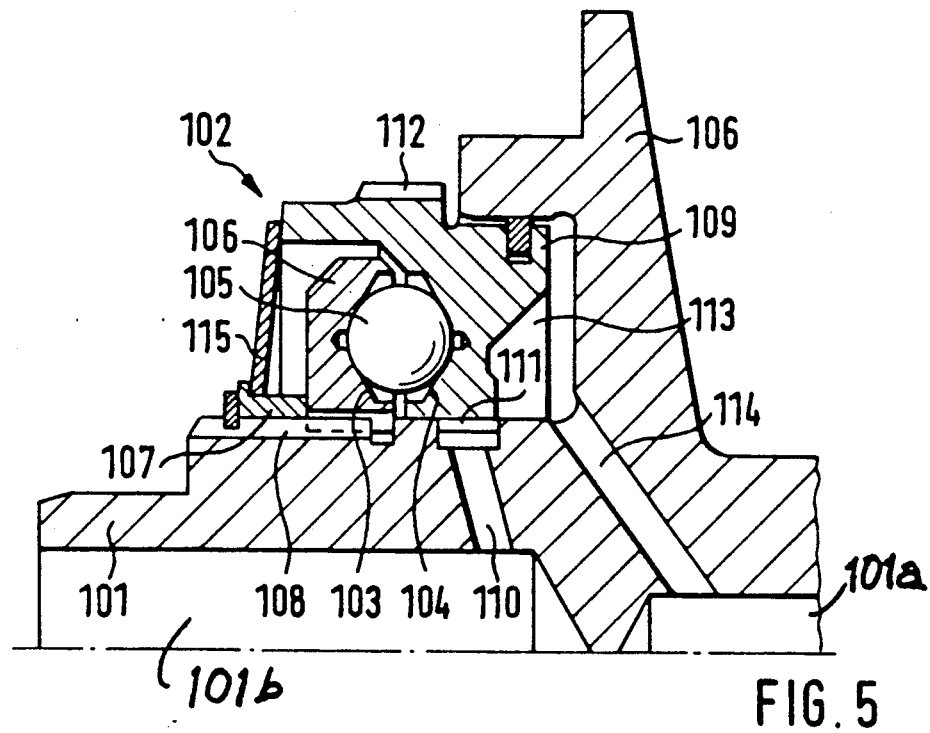

The pressure fluid flowing back via the parts 57, 58 of the valve 55 is collected in an internal bore 62 inside the spool 56 and connected to torque sensors 64 and 65 via a return flow line 63; these are torque sensors shown in FIG. 5, or in U.S. Pat. No. 4,261,213 or the aforementioned older German patent 18 16 950. In FIG. 2, the torque sensors 64, 65 are connected in parallel and to the return line 63.

Operation, FIG. 2

Due to the parallel connection, basically both torque sensors 64, 65 are activated directly by the pressure fluid return flow originating at the valve 55; depending on the operating state of the cone disk transmission 50, one or the other torque sensor is in an operating position and thus provides the throttled return flow to the outside of the pressure fluid flowing in the line 63. The other torque sensor at that time is highly pressurized, i.e. subjected to saturation pressure. It thus blocks the outflow of the quantities of pressure fluid received from the line 63.

In the case of FIG. 2, the sensor having the lower torque load at a given time accordingly determines the gripping level or the basic pressure acting via the control spool valve 55, while the other torque sensor is closed and thus inactive.

FIG. 2 shows again in simplified form a spool positioning unit 66 for positioning the spool 56; the unit 66 is controlled by a control unit 67, which is supplied with the actual and command or set-point values for the operating state of the transmission. Unit 67 provides control pulses to the unit 66 and, optionally, may control a planetary gear of the type shown in FIG. 1, and the clutches shown there.

Figure 3:
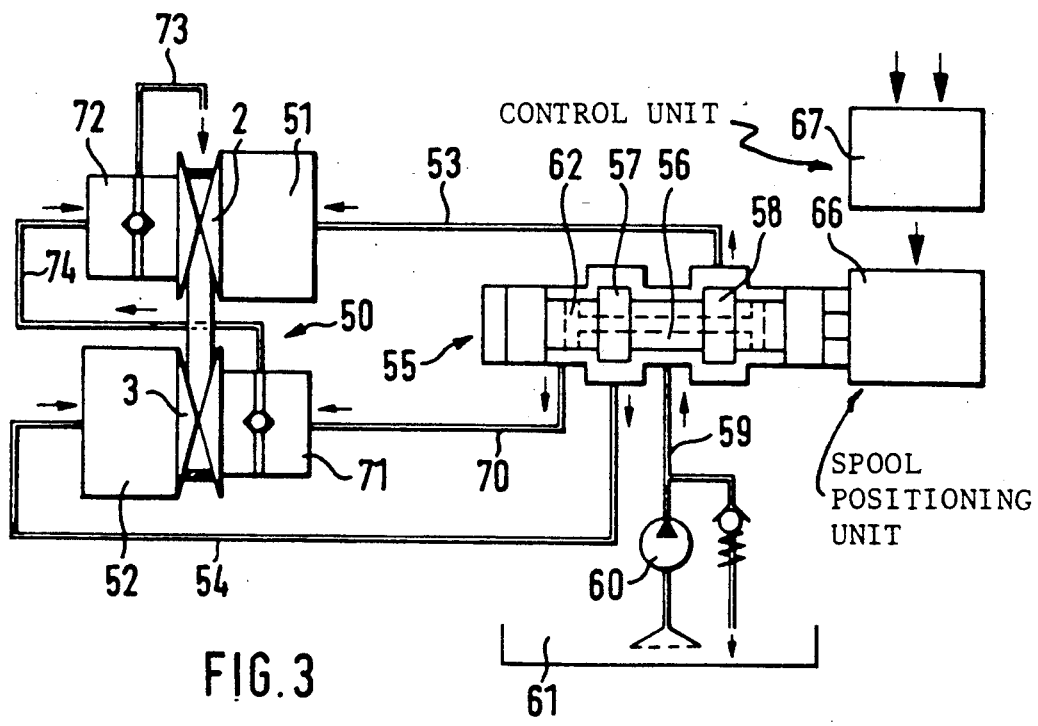

FIG. 3 shows a transmission layout similar to FIG. 2, and the same reference numerals are used. FIG. 3 differs from FIG. 2 in that, beginning at the return line 70 of the spool valve 55, the pressure fluid initially flows via the first torque sensor 71 and from there via line 74 to the torque sensor 72 and finally via the line 73 to open air and thus attains the pressureless state. If the pressure fluid is oil, it can be used as a drip lubricant for the chain or belt 24.

Accordingly, the two torque sensors 71, 72 are effectively hydraulically connected in series with respect to the return-flowing pressure fluid. This means that both torque sensors are activated continuously and jointly, and by addition of their throttling actions, determine the gripping or pressing level or, respectively, the basic pressure at the spool valve 55.

Operation, FIG. 3

Operation is essentially such that if the torque sensor 71 is initially in the return line 70, a flow opening due to the return flow pressure will occur; in the thus-throttled flow continuation line 74 in the return line, a second throttle effect, in the torque sensor 72 located on the other transmission shaft takes place. The overall result, as a function of the respective torques prevailing on the associated shafts, is that the throttle action is established at the torque sensors 71, 72, regardless of the direction in which the transmission is driven or loaded with torque.

Figure 4:
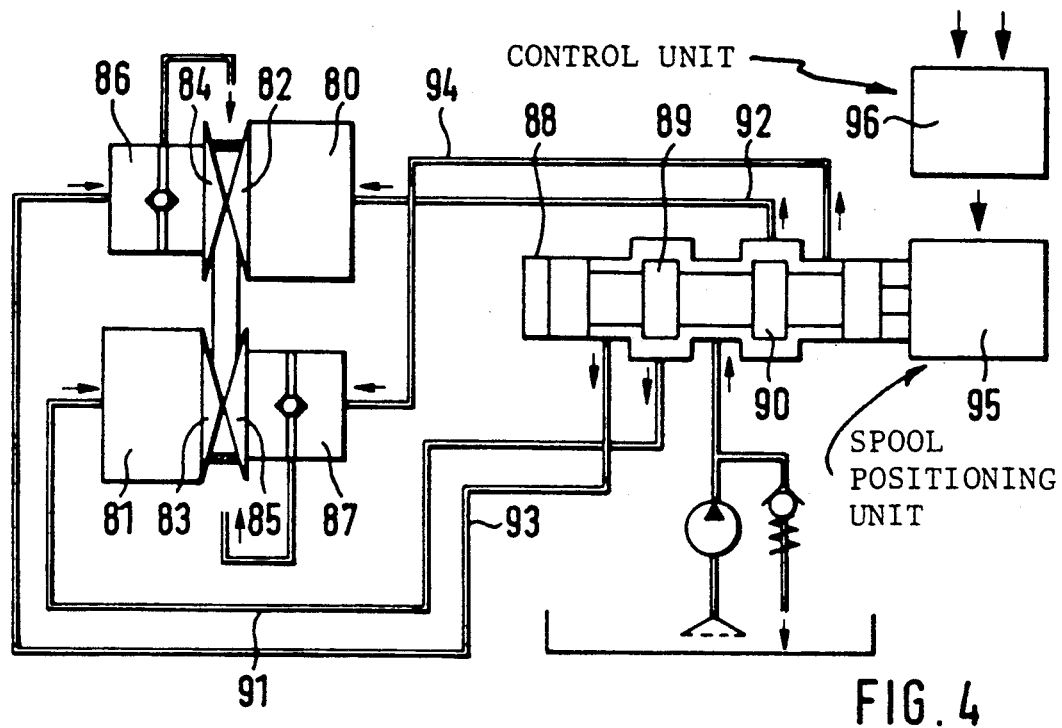

FIG. 4 shows an embodiment having a gripping mechanism 80 on one transmission shaft and a gripping mechanism 81 on the other; the gripping mechanisms are each connected to a respectively axially displaceable cone disk 82, 83.

Torque sensors 86, 87 are located beside the fixed cone disks 84, 85.

The gripping or clamping mechanisms 80, 81 are connected to the parts or regions 89, 90 of the spool valve 88 via pressure fluid lines 91, 92, while the torque sensors are each respectively connected via return lines 93, 94, which now, in contrast to the prior embodiments, are separately coupled to the spool valve 88, and are also no longer acted upon in the same manner with pressure fluid at supply pressure or at return or throttled pressure, respectively.

Instead, the arrangement is such that the spool of the control valve 88 no longer delivers the pressure fluid flowing out via the outer edges of the valve parts 89, 90 to a common return line, but instead keeps these separate from one another, due to the absence of such a common line such as line 62 in FIGS. 2 and 3.

The connection with the torque sensors 86, 87 is made by coupling one torque sensor at a time to the return flow of that particular control spool part 89, 90 which is associated with the gripping mechanisms of the opposite transmission shaft, see lines 93 and 94 for throttled fluid and lines 91, 92 for pressure fluid.

Operation, FIG. 4

The particular torque sensor on the drive side determines the pressure level and thus the pressing force on the respective set of disks on the driven side; the other torque sensor, as a result of the torque conditions then prevailing on its transmission side, is displaced such that the return of the pressure fluid pressure flow passing through it is closed.

In this way, the operation of the torque sensors is directly coordinated with the command position of the transmission. This command position is reflected in the position of the spool valve 88. Positioning unit 95, controlled by control unit 96, determines the command position. This is not dependent on whether the transmission and the cones thereon have already actually attained the commanded position.

The torque sensors, as noted at the outset, can be constructed as disclosed in U.S. Pat. No. 4,261,213 or the earlier German Patent 18 16 950, or as will now be described.

FIG. 5 shows a portion of a torque sensor as basically known from U.S. Pat. No. 4,439,170. A fixed cone 100 is secured to a shaft 101. The torque sensor portion is shown in genera at 102. It is a torque-dependent gripping or clamping device having opposed pressing cams 103, 104 and roller bodies, e.g., balls 105 placed between them. A first ring 106, which is remote from the fixed cone disk 100 and having the cams 103, is axially firmly supported at 107 on the transmission shaft 101 and is rotatably connected to the shaft 101 by a spring 108. A second ring 109, having the other cams 104, is axially displaceably located on the transmission shaft 101. It is rotatable between the first ring 106 and the fixed cone disk 100.

A radial bore 110 of the transmission shaft 101 and a circumferential groove 111 adjoining it in combination with the second ring 109 and with the transmission shaft 101 forms a control valve. Bore 101b corresponds to line 22, FIG. 1. An outer set of teeth 112 on ring 109 transmits torque into or out of the transmission.

A pressure chamber 113 is formed between the second ring 109 and the fixed cone disk 100. The return line of the respective four-edge spool valve communicates via a generally radially extending bore 114 with a central bore 101a of the transmission shaft 101. Bore 101a corresponds to line 20, FIG. 1, for example.

Operation, FIG. 5

This valve construction of the torque sensor functions basically as described in U.S. Pat. No. 4,261,213. An equilibrium will establish itself between the mechanical torque loading of the ring 109, resulting from the actions of the cams 103, 104, on the one hand, and the hydraulic loading of the ring 109 formed by the pressure of the pressure fluid in the chamber 113 on the other.

In accordance with a feature of the invention and in a modification of the known construction, the second axially movable ring 109 is pre-stressed in the direction toward the fixed cone disk 100 by a compression spring 115. Spring 115 is a cup spring, supported on the shaft 101 via the support 107. A torque-dependent control variable results from the interaction of the cams 103, 104 with the roller bodies 105. Spring 115 provides for pre-stressing of the cams 103, 104 on balls 105 and pre-setting of the valve formed between the ring 109 and the circumferential groove 111. As a result, the effects of changes in direction and consequent fluctuation of the torques transmittable by the gripping mechanisms of the axially displaceable cone disks are additionally lessened.

Various changes and modifications are possible and features of any embodiment may be combined with features of any other embodiment within the scope of the inventive concept.

We claim:

1. A cone disk transmission, especially for motor vehicles, having an infinitely settable and variable transmission ratio, having
   two pairs of cone disks (2, 3), one disk of each pair being axially displaceable;
   two shafts (14, 15), one of said shafts forming a driving shaft and the other a driven shaft, wherein the driving or driven operation of said shafts is selectively interchangeable, said pairs of cone disks being, respectively, mounted on a respective shaft;
   a hydraulic gripping or clamping mechanism (4, 5) coupled to the axially displaceable disk of each of the cone disk pairs and when acted upon by pressure fluid, generating clamping or gripping forces against a traction element (24) running between the cone disks of the pairs;
   a control spool valve (10);
   control means (42, 43, 44) coupled to said spool valve for controlling the position of a spool or slider thereof;
   a pressure fluid inlet (11) to the valve;
   pressure fluid lines (6, 7) coupled to said control spool valve and to said gripping and clamping mechanism (4, 5);
   two torque sensors (16, 17, 102), one each located on a respective shaft in the flow of torque between the shafts and said disks;
   valve return flow line connection means (18, 20, 21, 101a) connected between a return line connection of said spool valve and said torque sensors,
   said torque sensors, upon torque-dependent relative motion of the disks controlling the pressure of the pressure fluid acting on said hydraulic gripping or clamping mechanisms as a function of load,
   said torque sensors being controllable in their operation as a function of the operating state of the transmission,
   wherein both torque sensors are coupled to the fluid pressure return line connection means connected to said control spool valve;
   said transmission further including
   a gearing (26) coupled to said shafts;
   hydraulically controlled clutch means (25, 33) selectively controlling engagement of said shafts with said gearing;
   means (39, 38, 40, 41) for selectively applying hydraulic operating pressure to said clutch means (25, 33);
   a switch-over or transfer valve (19) connected in said return line connection means (18, 20, 21);
   said switch-over or transfer valve (19) being connected in the valve return flow line connection means from the spool valve (10, 55, 88) and switching the flow in said return line connection means to a respective one of said torque sensors (16, 17), and being controlled in dependence on commanded direction of torque or power transfer between said shafts; and
   means (38, 46, 48) controlling the switching position of said switch-over or transfer valve (19) as a function of the clutch operating pressure in said hydraulic clutch pressure applying means (39, 38).

2. The transmission according to claim 1 wherein said gearing comprises a planetary gearing (26);
   said hydraulically controlled clutch means comprises a first clutch (25) and a second clutch;
   wherein a planet carrier part (29) of the planetary gearing is coupled to a driving shaft (14) via the first clutch (25) and a step-down gear (28);
   a sun wheel part (30) of the planetary gearing is driven by the driven shaft (15);
   the annular gear wheel part or annulus part (31) of the planetary gearing forms the transmission output;
   the second clutch (33) is located between two of said parts (30, 31) of the planetary gear to disengage said planetary gear; wherein
   said control means (42, 44) controls said spool valve as a function of transmission and vehicle operating data externally supplied (43) thereto, said control means further controlling said clutches (25, 33) for engagement or disengagement as a function of transmission and vehicle operating data;
   and wherein said switch-over or transfer switching valve (19) connects the torque sensor (16) coupled to the shaft forming the driving side to the return line connecting means (18) to said control valve (10) when the second clutch (33) is engaged and connects the torque sensor (17) to said return line connection means (18) of the control spool valve (10) which is on the driven shaft, when the second clutch (33) is disengaged.

3. The transmission according to claim 2, wherein the hydraulic pressure applying means (39, 38, 40, 41) include
   switching valves (40, 41) hydraulically controlling said clutches and being controlled by said control means (42, 44);
   and wherein said switch-over or transfer switching valve (19) is hydraulically shifted between a first switching position determined by a compression spring (48) and a second switching position controlled by clutch operating pressure fluid supplied to said switching valve (40) and coupled to the second clutch (33).

4. The transmission according to claim 1, wherein at least one of said torque sensors comprises a torque dependent clamping or gripping means having opposed cam means (103, 104) and roller means (105) therebetween, said gripping cam means being axially spaced on said shafts;

- a first ring (106) carrying one (103) of said gripping cam means being axially supported on the respective shaft (101) in axially fixed position and rotating therewith;
- a second ring (109) carrying the other gripping cam means (104) being axially movably located on the respective shaft, and rotatable with respect to said first ring;
- hydraulic communication means (101a, 110, 111, 113, 114), upon axial displacement of one of said rings with respect to the shaft, forming a throttling valve means for controlling torque being transferred by said transmission;
- and wherein compression spring means (115) supported on the shaft (101) are provided bearing against the second ring (109) for prestressing the second ring (109) carrying said second cam (104) in the direction of the first ring (106) carrying the first cam (103) to thereby pre-stress the clamping effect of the gripping cam means against the roller means (105).

5. A cone disk transmission, especially for motor vehicles, having an infinitely settable and variable transmission ratio, having

- two pairs of cone disks (2, 3), one disk of each pair being axially displaceable;
- two shafts (14, 15), one of said shafts forming a driving shaft and the other a driven shaft, wherein the driving or driven operation of said shafts is selectively interchangeable, said pairs of cone disks being, respectively, mounted on a respective shaft;
- a hydraulic gripping or clamping mechanism (4, 5) coupled to the axially displaceable disk of each of the cone disk pairs and when acted upon by pressure fluid, generating clamping or gripping forces against a traction element (24) running between the cone disks of the pairs;
- a control spool valve ( 55 );
- control means ( 67, 66 ) coupled to said spool valve for controlling the position of a spool or slider thereof;
- a pressure fluid inlet (11) to the valve;
- pressure fluid lines (53, 54) coupled to said control spool valve and to said gripping and clamping mechanism (4, 5);
- two torque sensors (64, 65, 102), one each located on a respective shaft in the flow of torque between the shafts and said disks;
- valve return flow line connection means (63, 70, 74, 101a) connected between a return line connection of said spool valve and said torque sensors,
- said torque sensors, upon torque-dependent relative motion of the disks controlling the pressure of the pressure fluid acting on said hydraulic gripping or clamping mechanisms as a function of load,
- said torque sensors being controllable in their operation as a function of the operating state of the transmission,
- wherein both torque sensors are coupled to the fluid pressure return line connection means connected to said control spool valve;
- and wherein the torque sensors (64, 65) are both continuously connected in parallel to the pressure fluid return line connection means (63) and hence to said control spool valve (55).

6. The transmission according to claim 12, wherein at least one of said torque sensors comprises a torque dependent clamping or gripping means having opposed cam means (103, 104) and roller means (105) therebetween, said gripping cam means being axially spaced on said shafts;

- a first ring (106) carrying one (103) of said gripping cam means being axially supported on the respective shaft (101) in axially fixed position and rotating therewith;
- a second ring (109) carrying the other gripping cam means (104) being axially movably located on the respective shaft, and rotatable with respect to said first ring;
- hydraulic communication means (101a, 110, 111, 113, 114), upon axial displacement of one of said rings with respect to the shaft, forming a throttling valve means for controlling torque being transferred by said transmission;
- and wherein compression spring means (115) supported on the shaft (101) are provided bearing against the second ring (109) for prestressing the second ring (109) carrying said second cam (104) in the direction of the first ring (106) carrying the first cam (103) to thereby pre-stress the clamping effect of the gripping cam means against the roller means (105).

7. A cone disk transmission, especially for motor vehicles, having an infinitely settable and variable transmission ratio, having

- two pairs of cone disks (2, 3), one disk of each pair being axially displaceable;
- two shafts (14, 15), one of said shafts forming a driving shaft and the other a driven shaft, wherein the driving or driven operation of said shafts is selectively interchangeable, said pairs of cone disks being, respectively, mounted on a respective shaft;
- a hydraulic gripping or clamping mechanism (4, 5) coupled to the axially displaceable disk of each of the cone disk pairs and when acted upon by pressure fluid, generating clamping or gripping forces against a traction element (24) running between the cone disks cf the pairs;
- a control spool valve (88);
- control means ( 96, 95) coupled to said spool valve for controlling the position of a spool or slider thereof;
- a pressure fluid inlet (11) to the valve;
- pressure fluid lines (91, 92) coupled to said control spool valve and to said gripping and clamping mechanism (4, 5);
- two torque sensors (86, 87, 102), one each located on a respective shaft in the flow of torque between the shafts and said disks;
- valve return flow line connection means (93, 94, 101a) connected between a return line connection of said spool valve and said torque sensors,
- said torque sensors, upon torque-dependent relative motion of the disks controlling the pressure of the pressure fluid acting on said hydraulic gripping or clamping mechanisms as a function of load,
- said torque sensors being controllable in their operation as a function of the operating state of the transmission,
- wherein both torque sensors are coupled to the fluid pressure return line connection means connected to said control spool valve;

and wherein the torque sensors (71, 72) are serially connected in said pressure fluid return line connection means (70) and hence to said control spool valve (55).

8. The transmission according to claim 7, wherein at least one of said torque sensors comprises a torque dependent clamping or gripping means having opposed cam means (103, 104) and roller means (105) therebetween, said gripping cam means being axially spaced on said shafts;
- a first ring (106) carrying one (103) of said gripping Cam means being axially supported on the respective shaft (101) in axially fixed position and rotating therewith;
- a second ring (109) carrying the other gripping cam means (104) being axially movably located on the respective shaft, and rotatable with respect to said first ring;
- hydraulic communication means (101a, 110, 111, 113, 114), upon axial displacement of one of said rings with respect to the shaft, forming a throttling valve means for controlling torque being transferred by said transmission;
- and wherein compression spring means (115) supported on the shaft (101) are provided bearing against the second ring (109) for prestressing the second ring (109) carrying said second cam (104) in the direction of the first ring (106) carrying the first cam (103) to thereby pre-stress the clamping effect of the gripping cam means against the roller means (105).

9. A cone disk transmission, especially for motor vehicles, having an infinitely settable and variable transmission ratio, having
- two pairs of cone disks (2, 3), one disk of each pair being axially displaceable;
- a first shaft (14) and a second shaft (15), one of said shafts forming a driving shaft and the other a driven shaft, wherein the driving or driven operation of said shafts is selectively interchangeable, said pairs of cone disks being, respectively, mounted on a respective shaft;
- a first hydraulic gripping or clamping mechanism (80) coupled to the axially displaceable disk of one of the cone disk pairs on the first shaft (14);
- a second hydraulic gripping or clamping mechanism (81) coupled to the axially displaceable disk of a second cone disk pair on the second shaft (15),
- said gripping or clamping mechanisms, when acted upon by pressure fluid, generating clamping or gripping forces against a traction element (24) running between the cone disks of the pairs;
- a control spool valve (88);
- control means (86, 95) coupled to said spool valve for controlling the position of a spool or slider thereof;
- a pressure fluid inlet to the valve,
- wherein the control spool valve (88) comprises a four-edge spool having
  - a first valve portion (89) and a second valve portion (90),
  - a first return flow connection means (94) and a second return flow connection means (93), and
  - a first pressure fluid line (91) coupled to the second gripping or clamping mechanism (81) and a second pressure fluid line (92) coupled to the first (80) gripping or clamping mechanism;
- a first torque sensor (86) located on the first shaft (14) in the flow of torque between the shaft and the respective pair of disks;
- a second torque sensor (87) located on a second shaft (15) in the flow of torque between the second shaft and the respective pair of disks,
- said torque sensors, upon torque-dependent relative motion of the disks, controlling the pressure of the pressure fluid acting on said hydraulic gripping or clamping mechanisms as a function of load,
- said torque sensors being controllable in their operation as a function of the operating state of the transmission;

and wherein
- the first return flow connection means (94) connects the second torque sensor (87) on the second shaft (15) with the second valve portion (90), which second valve portion (90) is connected through the second pressure fluid line (92) to the first gripping or clamping mechanism (80) on said first shaft (14); and
- the second return flow connection means (93) connects the first torque sensor (86) on the first shaft (14) with the first valve portion (89), which first valve portion (89) is connected through the first pressure fluid line (91) to the second gripping or clamping mechanism (81) on the second shaft (15),
- whereby the torque sensor on one respective shaft will sense torque transmitted thereto or therefrom based on the torque coupled to said traction element (24) by the cone disk pair on the other respective shaft.

10. The transmission according to claim 1, wherein at least one of said torque sensors comprises a torque dependent clamping or gripping means having opposed cam means (103, 104) and roller means (105) therebetween, said gripping cam means being axially spaced on said shafts;
- a first ring (106) carrying one (103) of said gripping cam means being axially supported on the respective shaft (101) in axially fixed position and rotating therewith;
- a second ring (109) carrying the other gripping cam means (104) being axially movably located on the respective shaft, and rotatable with respect to said first ring;
- hydraulic communication means (101a, 110, 111, 113, 114), upon axial displacement of one of said rings with respect to the shaft, forming a throttling valve means for controlling torque being transferred by said transmission;
- and wherein compression spring means (115) supported on the shaft (101) are provided bearing against the second ring (109) for prestressing the second ring (109) carrying said second cam (104) in the direction of the first ring (106) carrying the first cam (103) to thereby pre-stress the clamping effect of the gripping cam means against the roller means (105).

* * * * *